(12) United States Patent
Xing et al.

(10) Patent No.: US 7,422,826 B2
(45) Date of Patent: Sep. 9, 2008

(54) IN SITU THERMAL POLYMERIZATION METHOD FOR MAKING GEL POLYMER LITHIUM ION RECHARGEABLE ELECTROCHEMICAL CELLS

(75) Inventors: Weibing Xing, Williamsville, NY (US); Esther S. Takeuchi, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 947 days.

(21) Appl. No.: 10/819,511

(22) Filed: Apr. 7, 2004

(65) Prior Publication Data
US 2005/0227150 A1    Oct. 13, 2005

(51) Int. Cl.
*H01M 6/18* (2006.01)
(52) U.S. Cl. .................. 429/317; 429/304; 429/309
(58) Field of Classification Search .................. 429/300, 429/303
See application file for complete search history.

(56) References Cited

U.S. PATENT DOCUMENTS

| | | | |
|---|---|---|---|
| 5,166,008 A | 11/1992 | Tomida et al. | |
| 5,194,490 A | 3/1993 | Suga et al. | |
| 5,223,353 A | 6/1993 | Oshawa et al. | |
| 5,240,791 A | 8/1993 | Izuti et al. | |
| 5,356,553 A | 10/1994 | Kono et al. | |
| 5,417,870 A | 5/1995 | Andrei et al. | |
| 5,463,179 A | 10/1995 | Chaloner-Gill et al. | |
| 5,597,659 A * | 1/1997 | Morigaki et al. ............ | 429/303 |
| 5,603,982 A | 2/1997 | Sun | |
| 5,609,974 A | 3/1997 | Sun | |
| 5,665,490 A | 9/1997 | Takeuchi et al. | |
| 5,681,357 A | 10/1997 | Eschbach et al. | |
| 5,723,231 A | 3/1998 | Wu et al. | |
| 5,783,331 A | 7/1998 | Inoue et al. | |
| 5,834,135 A | 11/1998 | Pendalwar et al. | |
| 5,849,433 A | 12/1998 | Venugopal et al. | |
| 5,853,916 A | 12/1998 | Venugopal et al. | |
| 5,962,168 A | 10/1999 | Denton, III | |
| 5,968,681 A | 10/1999 | Miura et al. | |
| 5,977,277 A | 11/1999 | Yokoyama et al. | |
| 6,013,393 A | 1/2000 | Taniuchi et al. | |
| 6,019,908 A | 2/2000 | Kono et al. | |
| 6,080,282 A | 6/2000 | Kolb et al. | |
| 6,096,234 A | 8/2000 | Nakanishi et al. | |
| 6,159,389 A | 12/2000 | Miura et al. | |
| 6,235,433 B1 | 5/2001 | Amano et al. | |

FOREIGN PATENT DOCUMENTS

JP      11121035 A      4/1999
JP      199911121035 W  4/1999

* cited by examiner

*Primary Examiner*—Patrick Ryan
*Assistant Examiner*—Julian Mercado
(74) *Attorney, Agent, or Firm*—Micheal F. Scalise

(57) ABSTRACT

A single step, in situ curing method for making gel polymer lithium ion rechargeable cells and batteries is described. This method used a precursor solution consisting of monomers with multiple functionalities such as multiple acryloyl functionalities, a free-radical generating activator, nonaqueous solvents such as ethylene carbonate and propylene carbonate, and a lithium salt such as $LiPF_6$. The electrodes are prepared by slurry-coating a carbonaceous material such as graphite onto an anode current collector and a lithium transition metal oxide such as $LiCoO_2$ onto a cathode current collector, respectively. The electrodes, together with a highly porous separator, are then soaked with the polymer electrolyte precursor solution and sealed in a cell package under vacuum. The whole cell package is heated to in situ cure the polymer electrolyte precursor. The resulting lithium ion rechargeable cells with gelled polymer electrolyte demonstrate excellent electrochemical properties such as high efficiency in material utilization, high Coulombic efficiency, good rate capability, and good cyclability.

38 Claims, 1 Drawing Sheet

IN SITU THERMAL POLYMERIZATION METHOD FOR MAKING GEL POLYMER LITHIUM ION RECHARGEABLE ELECTROCHEMICAL CELLS

BACKGROUND OF THE INVENTION

1. Field of the Invention

This invention relates to electrochemical power sources such as cells and batteries. Specifically, this invention relates to a method for making gel polymer lithium ion rechargeable or secondary cells and batteries. More specifically, the present invention relates to a single step, in situ polymerization method for making gel polymer lithium ion rechargeable cells and batteries.

2. Prior Art

The worldwide demand for portable electronic devices is growing rapidly and is responsible for the increasing need for high density and lightweight electrical energy power sources. To meet this growing demand, lithium ion secondary batteries, particularly rechargeable high energy density flat batteries containing gel polymer electrolytes, have been developed. These electrolyte chemistries comprise liquid plasticizers trapped in a polymer matrix. Gel polymer electrolytes have the following advantages compared with conventional liquid electrolytes: (a) they contain no free-flowing liquid and, therefore, the possibility of electrolyte leakage is eliminated, (b) they provide flexibility for engineering design, especially for flat and thin batteries, and (c) they are safer to use than their liquid counterparts.

An exemplary gel polymer electrolyte cell is described in U.S. Pat. No. 6,235,433 to Amano et al. This patent teaches a gel electrolyte comprising: i) a compound containing at least two polymerizable functional groups in the same molecule, and ii) one of a first through third compounds having a polymerizable functional group and containing a carbonyl group, a amido group, and an oxyalkylene group, respectively, in a vinylidene fluoride polymer. The compound containing at least two polymerizable functional groups has an unsaturated ethylene bond and, particularly, may have an acryloyl group or a methacryloyl group. Specific examples are diacrylates, triacrylates, tetraacrylates, and combinations thereof.

However, Amano et al. did not realize that a gel polymer electrolyte comprising acrylate functionalities could be improved upon with one acrylate having a relatively low functionality and another having a relatively high functionality. The former benefits reduced shrinkage, increased flexibility and adhesion, and free volume for ion conducting electrolyte flow while the latter promotes rapid polymerization.

SUMMARY OF THE INVENTION

In the present invention, a single step, in situ polymerization process is described for making gel polymer lithium ion rechargeable electrochemical cells. The process includes preparing gel polymer electrolyte precursor solutions consisting of multi-functional co-monomers, organic plasticizers, and an alkali metal salt, and then thermally curing the precursor solutions in a complete cell package. This greatly simplified process for making gel polymer lithium ion cells results in significantly improved production efficiencies.

These and other objects of the present invention will become increasingly more apparent to those skilled in the art by reference to the following description and the appended drawing.

DETAILED DESCRIPTION OF THE PREFERRED EMBODIMENTS

Figure 1:
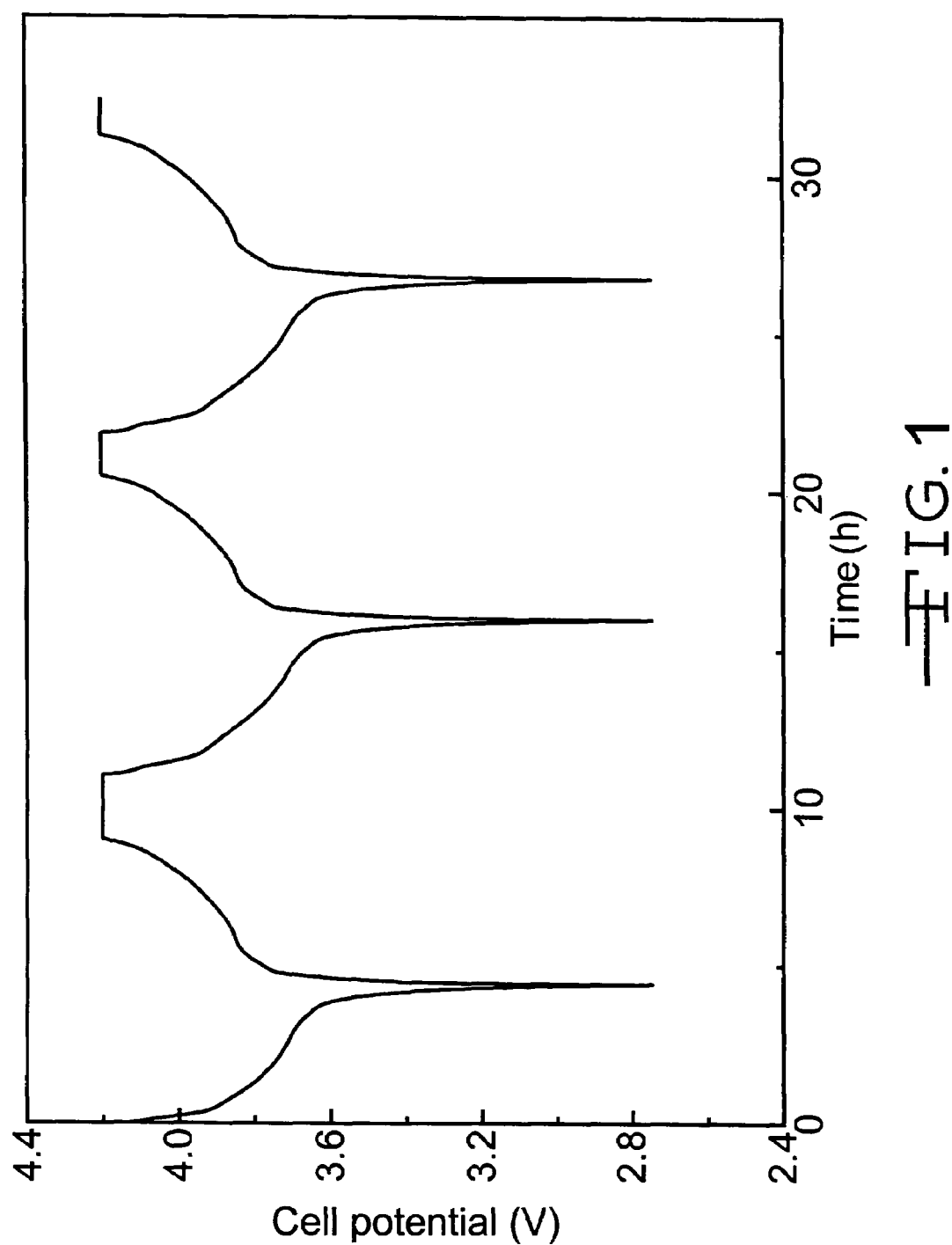
FIG. 1 is a graph constructed from the discharge-charge cycling of a cell activated with an electrolyte according to the present invention.

The electrochemical cell of the present invention is of a secondary, rechargeable chemistry. The cell comprises an anode active metal selected from Groups IA, IIA and IIIB of the Periodic Table of the Elements, including lithium, sodium, potassium, etc., and their alloys and intermetallic compounds including, for example, Li—Si, Li—Al, Li—B, Li—Mg and Li—Si—B alloys and intermetallic compounds. The preferred metal comprises lithium. An alternate negative electrode comprises a lithium alloy, such as lithium-aluminum alloy. Alloys increase the high temperature operation of such cells. The greater the weight percent of, for example, aluminum in the alloy, however, the lower the energy density of the cell.

In conventional secondary electrochemical systems, the anode or negative electrode comprises an anode material capable of intercalating and de-intercalating the anode active material, such as the preferred alkali metal lithium. Typically, the anode material of the negative electrode comprises any of the various forms of carbon (e.g., coke, graphite, acetylene black, carbon black, glassy carbon, etc.), which are capable of reversibly retaining the lithium species. Graphite is particularly preferred in secondary cells. "Hairy carbon" is another particularly preferred material due to its relatively high lithium-retention capacity. "Hairy carbon" is a material described in U.S. Pat. No. 5,443,928 to Takeuchi et al., which is assigned to the assignee of the present invention and incorporated herein by reference.

Regardless of the carbonaceous nature or makeup of the anode material, fibers are particularly advantageous. Fibers have excellent mechanical properties that permit them to be fabricated into rigid electrode structures capable of withstanding degradation during repeated charge/discharge cycling. Moreover, the high surface area of carbon fibers allows for rapid charge/discharge rates.

The carbonaceous portion of the present negative electrode is fabricated by mixing about 90 to 97 weight percent of an anode material, preferably a carbonaceous material, with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a copper, stainless steel, titanium, tantalum, platinum, gold, aluminum, nickel, cobalt nickel alloy, highly alloyed ferritic stainless steel containing molybdenum and chromium, and nickel-, chromium-, and molybdenum-containing alloy foil or screen by casting, pressing, rolling or otherwise contacting the admixture thereto.

A slurry coating method preferably prepares negative electrodes comprising the above-described active materials. A preferred negative electrode comprises a carbonaceous powder, such as graphite, mixed with a fluoro-polymeric binder, such as polyvinylidene fluoride (PVDF). This anode active admixture is then mixed with a solvent, such as N-methyl-2-pyrrolidinone (MNP), and the resulting anode active slurry is coated on a copper current collector foil using a doctor-blade. The anode active slurry coated current collector is then dried at an elevated temperature under vacuum.

In a secondary cell, the reaction at the positive electrode involves conversion of ions that migrate from the negative electrode to the positive electrode into atomic or molecular forms. The positive electrode preferably comprises air-stable lithiated active materials including oxides, sulfides, selenides, and tellurides of such metals as vanadium, titanium, chromium, copper, molybdenum, niobium, iron, nickel, cobalt and manganese. The more preferred oxides include $Li_xTi_5O_{12}$ (x=4 to 7), $Li_{3-x}M_xN$ (M=Co, Ni; x=0.1 to 0.6), $LiNiO_2$, $LiMn_2O_4$, $LiMnO_2$, $LiV_2O_5$, $LiCoO_2$, $LiCo_{0.92}Sn0.08O_2$ and $LiCo_{1-x}Ni_xO_2$.

To charge such secondary cells, lithium ions comprising the positive electrode are intercalated into the carbonaceous anode material by applying an externally generated electrical potential to the cell. The applied recharging potential draws lithium ions from the cathode active material, through the electrolyte and into the anode material to saturate it. In the case of carbon, the resulting $Li_xC_6$ material can have an x ranging 0.1 to 1.0. The cell is then provided with an electrical potential and discharged in a normal manner.

An alternate secondary cell construction comprises intercalating the carbonaceous anode material with the active lithium material before the negative electrode is incorporated into the cell. In this case, the positive electrode body can be solid and comprise, but not be limited to, such active materials as silver vanadium oxide (SVO), copper silver vanadium oxide (CSVO), $Ag_2O$, $Ag_2O_2$, $CuF_2$, $Ag_2CrO_4$, $MnO_2$, $V_2O_5$, $TiS_2$, $Cu_2S$, FeS, $FeS_2$, $CF_x$, copper oxide, copper vanadium oxide, and mixtures thereof. However, this approach is compromised by problems associated with handling lithiated carbon outside the cell. Lithiated carbon tends to react when contacted by air or water.

The above described cathode active materials are formed into a positive electrode by mixing one or more of them with a binder material. Suitable binders are the above described powdered fluoro-polymers, and more preferably powdered polytetrafluoroethylene or powdered polyvinylidene fluoride, present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 1 to 5 weight percent, a conductive diluent present at about 1 to 5 weight percent and about 90 to 98 weight percent of the cathode active material.

Rolling, spreading or pressing the cathode active formulations onto a suitable current collector of any one of the previously described materials suitable for the negative electrode may be used to prepare positive electrodes. The preferred current collector material is aluminum. If desired, the aluminum cathode current collector has a thin layer of graphite/carbon paint applied thereto.

A slurry coating method preferably prepares positive electrodes comprising the above-described active materials. A preferred positive electrode comprises a powdered form of one of the above-described lithium transition metal oxides, such as $LiCoO_2$, $LiNiO_2$ and $LiMn_2O_4$, combined with a conductive diluent, such as a carbonaceous material, and a binder to form the cathode slurry. This slurry is coated on the aluminum current collector foil using a doctor blade and dried at an elevated temperature under vacuum.

Positive electrodes prepared as described above may be in the form of one or more plates operatively associated with at least one or more plates of a negative electrode, or in the form of a strip wound with a corresponding strip of the negative electrode in a structure similar to a "jellyroll". Other electrode assemblies are also contemplated including button and flat batteries.

The electrochemical cell further includes a gel polymer electrolyte that serves as a medium for migration of ions between the negative and positive electrodes during electrochemical reactions of the cell. A suitable gel polymer electrolyte is prepared by mixing at least two monomers with a lithium salt, at least one nonaqueous solvent, and a thermal initiator or a free-radical generating activator.

The first monomer has at least one α-unsaturated functionality, and preferably from two to four α-unsaturated functionalities, while the second monomer has five or more α-unsaturated functionalities. Preferably, the first, lower functionality monomer, such as one having difunctionalities, is used to reduce shrinkage and to provide the resulting polymer with flexibility, adhesion, and free volume for ion conducting electrolytes. The second higher functional monomer provides for relatively rapid curing inside the cell casing to form a cross-linked matrix or network. It is known that monomers with lower functionalities (e.g., two double bonds) and long side chains shrink less during polymerization compared with those with higher functionalities (e.g., six double bonds). For example, use of ethoxylated bisphenol diacrylate as the first co-monomer reduces the overall shrinkage in comparison to when dipentaerythritol hexaacrylate is used alone. Such cross-linking compounds serve as a host for ion conducting liquid electrolytes and as a separator in the electrochemical cell. In either case, the multi-functional monomers are (methyl)acryloyl monomers having at least one of an alkyl, alkyl ether, alkoxylated alkyl, and alkoxylated phenol functional group.

Suitable first monomers include ethoxylated bisphenol diacrylate, hexanediol diacrylate, trimethylolpropane trimethacrylate, ethoxylated trimethylolpropane triacrylate (ETMPTA), pentaerythritol tetraacrylate, ethoxylated pentaerythritol tetraacrylate, di(trimethylolpropane) tetraacrylate (DTMPTA), and mixtures thereof. Preferred second monomers are selected from dipentaerythritol hexaacrylate (DPHA), dipentaerythritol pentaacrylate (DPAA), and mixtures thereof.

The nonaqueous solvent is of a polar aprotic organic solvent such as cyclic carbonates, cyclic esters, cyclic amides and dialkyl carbonates including ethylene carbonate (EC), propylene carbonate (PC), butylene carbonate (BC), γ-butyrolactone (GBL), ethyl propyl carbonate (EPC), N,N-diethylacetamide, and mixtures thereof. Preferably, a binary solvent mixture is used, such as one of EC/PC.

Known lithium salts that are useful as a vehicle for transport of alkali metal ions between the negative electrode and the positive electrode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LISCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof. Preferably, $LiPF_6$ in a concentration of from about 0.5M to about 1.5M is dissolved in the organic solvents or co-solvents as an ion conducting liquid electrolyte.

Suitable thermal initiators as free-radical generating compounds include benzoyl peroxide (BPO), 1,1'-azobis(cyclohexanecarbonitrile) (ACN), 4,4-azobis(4-cyanovaleric acid), lauroyl peroxide, 1,1-bis(tert-butylperoxy)cyclohexane, 1,1-bis(tert-amylperoxy)cyclohexane, and mixtures thereof.

The monomers are present in the gel polymer electrolyte precursor solution in a concentration of about 4% to about 15%, by weight. The concentration of the thermal initiator is about 0.3% to about 1.0%, by weight, of the electrolyte solution. The thusly-prepared gel polymer electrolyte precursor solution is a free-flowing liquid of relatively low viscosity.

In order to prevent internal short circuit conditions, the negative electrode is separated from the positive electrode by a suitable separator material. The separator is of electrically insulative material, is chemically unreactive with the anode and cathode active materials, and both chemically unreactive with and insoluble in the gel polymer electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C.H. Dexter, Div., Dexter Corp.

A preferred electrode assembly includes the negative and positive electrodes and an intermediate separator of a non-woven fabric and a polypropylene/polyethylene microporous membrane that are each soaked with the gel polymer electrolyte precursor solution. A number of stacked electrode assemblies are combined to form a battery of a desired high voltage or high capacity. The stacked assembly is then sealed in a foil/poly outer bag under vacuum. This assembly is then hermetically sealed in a prismatic or cylindrical metal container or casing. Finally, the cell package is heated in an oven at an elevated temperature for a time sufficient to in situ cure the gel polymer electrolyte precursor solution. Suitable heating temperatures range from about 75° C. to about 85° C. for about 10 minutes to about one hour.

Electrochemical cells prepared according to this invention exhibit a completely cured gel polymer electrolyte devoid of any free-flowing liquid and good adhesion exists between the electrodes and the solid polymer electrolyte. Such cells are cycleable from about −20° C. to about 50° C.

The following example describes the structure and processes for providing a gel polymer rechargeable electrochemical cell according to the present invention, and it sets forth the best mode contemplated by the inventors of carrying out the invention, but it is not to be construed as limiting.

EXAMPLE I

Polymer electrolyte precursor solutions were prepared from, by weight, 8% of co-monomers consisting of ethoxylated trimethylolpropane triacrylate (ETMPTA) and di(trimethylolpropane) tetraacrylate (DTMPTA) mixed with a liquid electrolyte solution of 1M $LiPF_6$ in 2EC:PC. The weight ratios of ETMPTA/DTMPTA were 3:1, 1:1 and 1:3 for the polymer electrolyte precursor solutions used in test cells nos. 1a, 1b and 1c, respectively. To the above solutions, 0.5% ACN as a thermal initiator was added.

Test cell nos. 1a to 1c were constructed having an negative electrode of, by weight, 91.7% mesocarbon microbeads (MCMB 25-28) and 8.3% PVDF powders mixed with NMP. The resulting anode active slurry was coated on a 10.2 μm thick copper current collector substrate. The positive electrode was formed by mixing powders of, by weight, 91.0% $LiCoO_2$, 3.0% PVDF and 6.0% graphite in a solvent of NMP coated to a thickness of 25.4 μm on an aluminum current collector substrate. The electrode active structures were then dried at 100° C. under vacuum for at least six hours and die-cut to 4.0 cm×6.9 cm (27.6 $cm^2$) to form the negative electrode and to 3.8 cm×6.7 cm (25.5 $cm^2$) to form the positive electrode.

The electrodes, together with a 50.8 μm thick non-woven fabric separator (Nippon Kodoshi Corporation), were soaked with the above-described polymer electrolyte precursor solution and stacked as an anode/fabric/cathode assembly. This stacked electrode assembly was sealed under vacuum in a poly/foil bag and put in an oven heated to about 79° C. for about 16 minutes for in situ polymerization.

After curing, the cells were cycled three times at room temperature between 2.75 V and 4.20 V at 0.2 C, followed by one cycle at 1 C. Table 1 shows respective cell capacities at 0.2 C and 1 C while FIG. 1 illustrates the room temperature cycling results of cell 1c at the 0.2 C capacity. The capacities at 1 C for each of the test cells in this example were above 90% of that at 0.2 C, and the Coulombic efficiencies were larger than 98%.

TABLE 1

| Test Cell No. | Polymer elec. (8% co-monomers; 0.5% ACN) ETMPTA:DTMPTA = | Capacity (mAh, @0.2 C) | 1 C Cap (%, vs. 0.2 C) | Coulombic Effiency |
|---|---|---|---|---|
| 1a | 3:1 | 70.3 | 90.3% | 0.982 |
| 1b | 1:1 | 72.3 | 91.2% | 0.987 |
| 1c | 1:3 | 68.5 | 90.5% | 0.988 |

The above example clearly sets forth that gel polymer rechargeable cells prepared according to this invention demonstrated good chemical and electrochemical stabilities, high efficiency in material utilization, high Coulombic efficiency, good rate capability, and high capacity retention upon cycling.

It is appreciated that various modifications to the present inventive concepts described herein may be apparent to those of ordinary skill in the art without departing from the spirit and scope of the present invention as defined by the herein appended claims.

What is claimed is:

1. An electrochemical cell, comprising:
   a) a casing;
   b) a negative electrode comprising an anode active material contacted to an anode current collector;
   c) a positive electrode comprising a cathode active material contacted to a positive current collector;
   d) a separator intermediate the negative and positive electrodes; and
   e) an electrolyte comprising:
      i) a first monomer having more than one (methyl)acryloyl functionality;
      ii) a second monomer having five or more α-unsaturated functionalities; and
      iii) a thermal initiator mixed with an alkali metal salt and at least one organic solvent, wherein the negative electrode, the positive electrode and the intermediate separator are characterized as having been soaked in the electrolyte to provide an electrode assembly housed in the casing and heated to provide the electrochemical cell.

2. The electrochemical cell of claim 1 wherein the first monomer has more than one α-unsaturated functionality.

3. The electrochemical cell of claim 1 where in the first monomer has two to four (methyl) acryloyl functionalities.

4. The electrochemical cell of claim 1 wherein the (methyl) acryloyl first monomer has at least one functional group selected from the group consisting of alkyl, alkyl ether, alkoxylated alkyl and alkoxylated phenol functional groups.

5. The electrochemical cell of claim 1 wherein the first monomer is selected from the group consisting of ethoxylated bisphenol diacrylate, hexanediol diacrylate, trimethlolpropane trimethacrylate, ethoxylated trimethylolpropane triacrylate, pentaerythritol tetraacrylate, ethoxylated pentaerythritol tetraacrylate, di(trimethylolpropane) tetraacrylate, and mixtures thereof.

6. The electrochemical cell of claim 1 wherein the second monomer has five or six α-unsaturated functionalities.

7. The electrochemical cell of claim 1 wherein the second monomer is selected from the group consisting of dipentaerythritol hexaacrylate, dipentaerythritol pentaacrylate, and mixtures thereof.

8. The electrochemical cell of claim 1 wherein the combined concentrations of the first and second monomers in the electrolyte is about 4% to about 15%, by weight.

9. The electrochemical cell of claim 1 including selecting the organic solvent from the group consisting of ethylene carbonate, propylene carbonate, butylene carbonate, γ-butyrolactone, ethyl propyl carbonate, N,N-diethylacetamide, and mixtures thereof.

10. The electrochemical cell of claim 1 wherein the initiator is selected from the group consisting of 1,1'-azobis(cyclohexanecarbonitrile), benzoyl peroxide, 4,4-azobis(4-cyanovaleric acid), lauroyl peroxide, 1,1-bis(tert-butylperoxy) cyclohexane, 1,1-bis (tert-amylperoxy)cyclohexane, and mixtures thereof.

11. The electrochemical cell of claim 1 wherein the initiator is present in the electrolyte in a concentration of, by weight, about 0.3% to about 1%.

12. The electrochemical cell of claim 1 wherein the alkali metal salt is selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LIB(C_6H_5)_4$, $LiCF_3SO_3$, and mixtures thereof.

13. The electrochemical cell of claim 1 wherein the cell is characterized as having been heated to a temperature ranging from about 75° C., to about 85° C.

14. The electrochemical cell of claim 1 wherein the cell is characterized as having been heated for about 10 minutes to about one hour.

15. The electrochemical cell of claim 1 wherein the anode active material is selected from the group consisting of coke, graphite, acetylene black, carbon black, glassy carbon, hairy carbon, and mixtures thereof.

16. The electrochemical cell of claim 1 wherein the cathode active material is selected from the group consisting of oxides, sulfides, selenides, and tellurides of vanadium, titanium, chromium, copper, molybdenum, niobium, iron, nickel, cobalt, manganese, and mixtures thereof.

17. An electrochemical cell, comprising:
a) a casing;
b) a negative electrode comprising an anode active material selected from the group consisting of coke, graphite, acetylene black, carbon black, glassy carbon, hairy carbon, and mixtures thereof contacted to an anode current collector;
c) a positive electrode comprising a cathode active material selected from the group consisting of $Li_xTi_5O_{12}$ (x=4 to 7), $Li_{3-x}M_xN$ (N=Co, Ni; x=0.1 to 0.6), $LiNiO_2$, $LiMn_2O_4$, $LiMnO_2$, $LiV_2O_5$, $LiCoO_2$, $LiCo_{0.92}Sn_{0.08}O_2$, $LiCo_{1-x}Ni_xO_2$, SVO, CSVO, $Ag_2O$, $Ag_2O_2$, $CuF_2$, $Ag_2CrO_4$, $MnO_2$, $V_2O_5$, $TiS_2$, $Cu_2S$, FeS, $FeS_2$, $CF_x$, copper oxide, copper vanadium oxide, and mixtures thereof contacted to a positive current collector;
d) a separator intermediate the negative and positive electrodes; and
e) an electrolyte comprising:
i) a first monomer having more than one (methyl)acryloyl functionality;
ii) a second monomer having five or more α-unsaturated functionalities; and
iii) a thermal initiator mixed with an alkali metal salt and at least one organic solvent, wherein the negative electrode, the positive electrode and the intermediate separator are characterized as having been soaked in the electrolyte to provide an electrode assembly housed in the casing and heated to provide the electrochemical cell.

18. A method for providing an electrochemical cell, comprising the steps of:
a) providing a negative electrode comprising an anode active material contacted to an anode current collector;
b) providing a positive electrode comprising a cathode active material contacted to a positive current collector;
c) providing a separator intermediate the negative and positive electrodes;
d) preparing an electrolyte comprising:
i) a first monomer having more than one (methyl) acryloyl functionality
ii) a second monomer having five or more α-unsaturated functionalities; and
iii) a thermal initiator mixed with an alkali metal salt and at least one organic solvent; and
e) soaking the negative electrode, the positive electrode and the intermediate separator in the electrolyte to provide an electrode assembly;
f) housing the electrode assembly in a casing; and
g) heating the casing housing the electrode assembly to provide the electrochemical cell.

19. The method of claim 18 including providing the first monomer having more than one α-unsaturated functionality.

20. The method of claim 18 including providing the first monomer having two to four (methyl)acryloyl functionalities.

21. The method of claim 18 including providing the (methyl)acryloyl first monomer having at least one functional group selected from the group consisting of alkyl, alkyl ether, alkoxylated alkyl and alkoxylated phenol functional groups.

22. The method of claim 18 including selecting the first monomer from the group consisting of ethoxylated bisphenol diacrylate, hexanediol diacrylate, trimethylolpropane trimethacrylate, ethoxylated trimethylolpropane triacrylate, pentaerythritol tetraacrylate, ethoxylated pentaerythritol tetraacrylate, di(trimethylolpropane) tetraacrylate, and mixtures thereof.

23. The method of claim 18 including providing the second monomer having five or six α-unsaturated functionalities.

24. The method of claim 18 including selecting the second monomer from the group consisting of dipentaerythritol hexaacrylate, dipentaerythritol pentaacrylate, and mixtures thereof.

25. The method of claim 18 including providing the combined concentrations of the first and second monomers in the electrolyte at about 4% to about 15%, by weight.

26. The method of claim 18 including selecting the organic solvent from the group consisting of cyclic carbonates, cyclic esters, cyclic amides, dialkyl carbonates, and mixtures thereof.

27. The method of claim 18 including selecting the organic solvent from the group consisting of ethylene carbonate, propylene carbonate, butylene carbonate, ethyl propyl carbonate, N,N-diethylacetamide, γ-butyrolactone, and mixtures thereof.

28. The method of claim 18 including providing the organic solvent as a mixture of ethylene carbonate and propylene carbonate.

29. The method of claim 18 including selecting the initiator from the group consisting of benzoyl peroxide, 1,1'-azobis (cyclohexanecarbonitrile), 4,4-azobis(4-cyanovaleric acid), lauroyl peroxide, 1,1-bis(tert-butylperoxy)cyclohexane, 1,1-bis(tert-amylperoxy) cyclohexane, and mixtures thereof.

30. The method of claim 18 including providing the initiator in a concentration of about 0.3% to about 1%, by weight, of the electrolyte.

31. The method of claim 18 including selecting the alkali metal salt from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

32. The method of claim 18 including heating the casing to a temperature ranging from about 75° C. to about 85° C.

33. The method of claim 18 including heating the casing for about 10 minutes to about one hour.

34. The method of claim 18 including selecting the anode active material from the group consisting of coke, graphite, acetylene black, carbon black, glassy carbon, hairy carbon, and mixtures thereof.

35. The method of claim 18 including selecting the anode current collector from the group consisting of copper, stainless steel, titanium, tantalum, platinum, gold, aluminum, nickel, cobalt nickel alloy, highly alloyed ferritic stainless steel containing molybdenum and chromium, and nickel, chromium-, and molybdenum-containing alloy.

36. The method of claim 18 including selecting the cathode active material from the group consisting of oxides, sulfides, selenides, and tellurides of vanadium, titanium, chromium, copper, molybdenum, niobium, iron, nickel, cobalt and manganese.

37. The method of claim 18 including selecting the cathode active material from the group consisting of $Li_xTi_5O_{12}$ (x=4 to 7), $Li_{3-x}M_xN$ (M=Co, Ni; x=0.1 to 0.6), $LiNiO_2$, $LiMn_2O_4$, $LiMnO_2$, $LiV_2O_5$, $LiCoO_2$, $LiCo_{0.92}Sn_{0.08}O_2$, $LiCo_{1-x}Ni_xO_2$, and mixtures thereof.

38. The method of claim 18 including selecting the cathode current collector from the group consisting of copper, stainless steel, titanium, tantalum, platinum, gold, aluminum, nickel, cobalt nickel alloy, highly alloyed ferritic stainless steel containing molybdenum and chromium, and nickel, chromium-, and molybdenum-containing alloy.

* * * * *

UNITED STATES PATENT AND TRADEMARK OFFICE
CERTIFICATE OF CORRECTION

| | |
|---|---|
| PATENT NO. | : 7,422,826 B2 |
| APPLICATION NO. | : 10/819511 |
| DATED | : September 9, 2008 |
| INVENTOR(S) | : Xing et al. |

Page 1 of 1

It is certified that error appears in the above-identified patent and that said Letters Patent is hereby corrected as shown below:

Column 3, line 11, delete "LiCo$_{0.92}$Sn0.08O$_2$" and insert --LiCo$_{0.92}$Sn$_{0.08}$ O$_2$--.

Column 10, line 9, delete "nickel" and insert --nickel- --.

Column 10, line 26, delete "nickel" and insert --nickel- --.

Signed and Sealed this

Eleventh Day of November, 2008

JON W. DUDAS
*Director of the United States Patent and Trademark Office*